United States Patent [19]

Leyman, III

[11] 4,312,328
[45] Jan. 26, 1982

[54] MOVABLE SOLAR COLLECTOR

[75] Inventor: Harry S. Leyman, III, Cincinnati, Ohio

[73] Assignee: Leyman Manufacturing Corporation, Cincinnati, Ohio

[21] Appl. No.: 10,611

[22] Filed: Feb. 9, 1979

[51] Int. Cl.³ .............................................. F24J 3/02
[52] U.S. Cl. ..................................... 126/426; 126/434; 126/435; 126/450; 126/431; 160/232; 98/87
[58] Field of Search ............... 126/426, 445, 450, 431, 126/434, 435, 446, 449, 428, 432; 160/232, 201; 98/87, 31; 34/93; 16/178

[56] References Cited

U.S. PATENT DOCUMENTS

| | | | |
|---|---|---|---|
| 3,823,703 | 7/1974 | Lanciault | 126/426 |
| 3,902,474 | 9/1975 | Pyle | 126/270 |
| 3,919,998 | 11/1975 | Parker | 126/270 |
| 3,996,918 | 12/1976 | Quick | 126/270 |
| 4,006,856 | 2/1977 | Nilsson | 126/270 |
| 4,059,095 | 11/1977 | Grundmann | 126/426 |
| 4,069,809 | 1/1978 | Strand | 126/270 |
| 4,073,282 | 2/1978 | Schriefer | 126/270 |
| 4,076,025 | 2/1978 | Parker | 126/270 |
| 4,080,221 | 3/1978 | Manelas | 126/270 |
| 4,086,909 | 5/1978 | Lyon et al. | 126/270 |
| 4,090,494 | 5/1978 | Borst et al. | 126/270 |
| 4,135,490 | 1/1979 | Soleau | 126/450 |

Primary Examiner—Samuel Scott
Assistant Examiner—G. Anderson
Attorney, Agent, or Firm—Wood, Herron & Evans

[57] ABSTRACT

A movable solar collector structured to move between a first or solar collecting position and a second or storage position as desired by the user. The movable solar collector may be in the nature of a closure member adapted to close an entryway in the first position and open that entryway in the second position. One preferred form is an overhead door, e.g., a garage door, comprised of a plurality of door panels. Each door panel is structured to collect solar energy, and is hinged to adjacent door panels so that the panels can be moved between a generally vertical closure position where the collector is exposed to solar energy, and a generally horizontal open position where the collector is elevated above ground level. The plural door panels are structured to establish an integrated hollow collector unit when in the first position, the plural panels cooperating with a fluid that circulates interiorly thereof for absorbing solar energy into that fluid. One of the panels is connected with exterior piping in the collector's first position for transmitting solar energy received by the fluid to a remote use location.

33 Claims, 16 Drawing Figures

MOVABLE SOLAR COLLECTOR

This invention relates to solar collectors. More particularly, this invention relates to a solar collector structure that, after installation thereof, is movable between first and second positions as desired by the user.

In recent years the field of solar energy has been given more and more attention as a potential alternative energy source in the United States of America, as well as elsewhere. One prime reason for this recent attention to solar energy is the cost increases seen in recent years for the historical forms of energy. Another prime reason for this recent attention is the supply problem here in the United States of fossil fuel type energy, e.g., crude oil supply, because of political problems in those areas of the world with significant oil reserves. A further prime reason for the current interest is recent widespread recognition of the fact that historical fossil fuel forms are not limitless.

In light of the attention on solar energy as an alternative energy source, there have been developed in recent years, as well as earlier, means for collecting solar energy. In recent years, development of mechanisms and methods for collecting solar energy have accelerated to the extent that there are numerous different types of solar collectors known to the art. Further, and in the last few years, a number of different solar energy heating systems, as well as solar energy collectors and methods, have been made available for industrial and commercial use, as well as for residential use, in the market place. Indeed, it is now no longer considered out of the ordinary for a residence, or for an industrial or commercial building, to be provided with some form of solar energy collector for aid in heating the building's hot water supply and/or for aid in space heating the building's interior environment.

One of the basic problems associated with the solar energy collectors known to the prior art has been the fact that separate collector units are required for installation on a building's exterior, e.g., on the building's roof or side wall, or for installation separate and apart from the building as a free standing unit. These separate or independent collector units are, of course, an additional expense in the initial building costs when installed in a new building. Further, the solar energy collectors known to the marketplace usually perform only one function, e.g., the collection of solar energy, in the sense that they usually do not take the place of or replace required components of the building structure. This is particularly true in the case of solar collector units added to already existing building structures.

It has been the primary objective of this invention to provide an improved and novel solar collector that, after installation and during use, is movable between first and second positions as desired by the user. One preferred form of this movable solar collector is as a closure member for an entryway, e.g., a garage door, which is movable between a closed position in which the member functions as a solar collector and as a closure, and a second or opened position in which the member allows ingress and egress through the entryway but in which the member may or may not function as a solar collector.

It has been another objective of this invention to provide an improved door adapted to function as a closure member as well as a solar collector, the door being movable between a closure position in which the door closes an entryway and in which the door is exposed to solar energy for heating a fluid that circulates within the door, and an open position in which the door is located generally horizontal to ground for permitting ingress and egress through the entryway, the solar energy captured by the fluid circulating within the door being transferable to a remote use location through conveyance structure connected with the door.

A still further objective of this invention is to provide a solar collecting overhead door that includes a plurality of door panels each of which is structured to collect solar energy, hinge structure connecting the door panels one to another on a series of hinge lines horizontal relative to ground, the hinge structure permitting the panels to move between a generally vertical door closed position and a generally horizontal door opened position for allowing an entryway to be opened and closed, and conveyance structure connected with at least one of the panels for transmitting the solar energy received by all of the panels to a remote use location.

It has been a still further objective of this invention to provide a solar collecting overhead door comprising a plurality of hollow door panels, the door panels being connected one with another in the closure position of the door for defining an integrated hollow collector unit that includes all of the door panels so that a primary fluid, e.g., air, in the door's bottom panel can move upwardly through intermediate panels to the door's top panel, the primary fluid being cooperable with a heat exchanger carried in one of the panels for transferring solar energy received by the primary fluid to a secondary fluid, e.g., water, for transfer of that solar energy to a remote use location, and the door being movable between vertical open and closed positions as desired by the user.

It has been still another objective of this invention to provide an improved solar collecting overhead door comprising a plurality of hollow door panels, the door panels being connected one with another in the closure position of the door for all of the door's panels so that a fluid in the door's bottom panel can move upwardly through intermediate panels to the door's top panel, the fluid medium introduced into the bottom door panel and removed from the top door panel being the same fluid that transfers the solar energy received by that fluid interiorly of the door panels to a remote use location, and the door being movable between vertical open and closed positions as desired by the user.

Other objectives and advantages of this invention will be more apparent from the following detailed description taken in conjunction with the drawings in which.

A preferred embodiment of a movable solar collector 10 in accord with the principles of this invention is illustrated in FIGS. 1–6. As shown in those figures, the movable solar collector 10 is in the nature of a closure member such as an overhead door. The solar collector 30 or overhead door 10 may be used as a closure member for entranceways or doorways to commercial, industrial, or residential buildings. In the particular embodiment shown, the overhead door is particularly adapted for use as a garage door in a double garage of a residential building.

The overhead door solar collector 10 is basically comprised of four solar collector panels 11 each of which is structurally inflexible or rigid, which are structurally independent of one another, and which are hingedly connected together on spaced hinge axes 12 in overhead door fashion all as shown in FIGS. 1–3 and 6. The four hinged together panels 11 are provided with a series of rollers 13 along each side edge 14. The rollers 13 cooperate with tracks 15 mounted to the building's, e.g., the garage's, framework (not shown). The collector 10 is also provided with a spring motor 16 on each side thereof which is connected at one end to the building's framework and at the other end through cable 17 to the bottom edge 18 of the collector. The spring motors 16 aid the collector's user, i.e., the homeowner, in raising the collector 10 from a vertical first or solar collecting position shown in FIG. 1 to an overhead horizontal or storage second position, not shown. In this FIGS. 1–6 embodiment, the movable solar collector 10 is structured to provide fluid-to-fluid heat transfer of the solar energy collected. The first fluid is a gas, e.g., air, which is induced to move in a first generally vertical closed loop path 19 (see FIGS. 1 and 5) through the collector panels 11 due to convection currents set up with the panels upon exposure to solar energy. The second fluid is a liquid, e.g., water, which is passed through a heat exchanger 20 mounted in the collector's top panel 11a. The water circulates in an open loop 21 with a remote use location, e.g., a hot water tank 22.

Figures 2, 3:
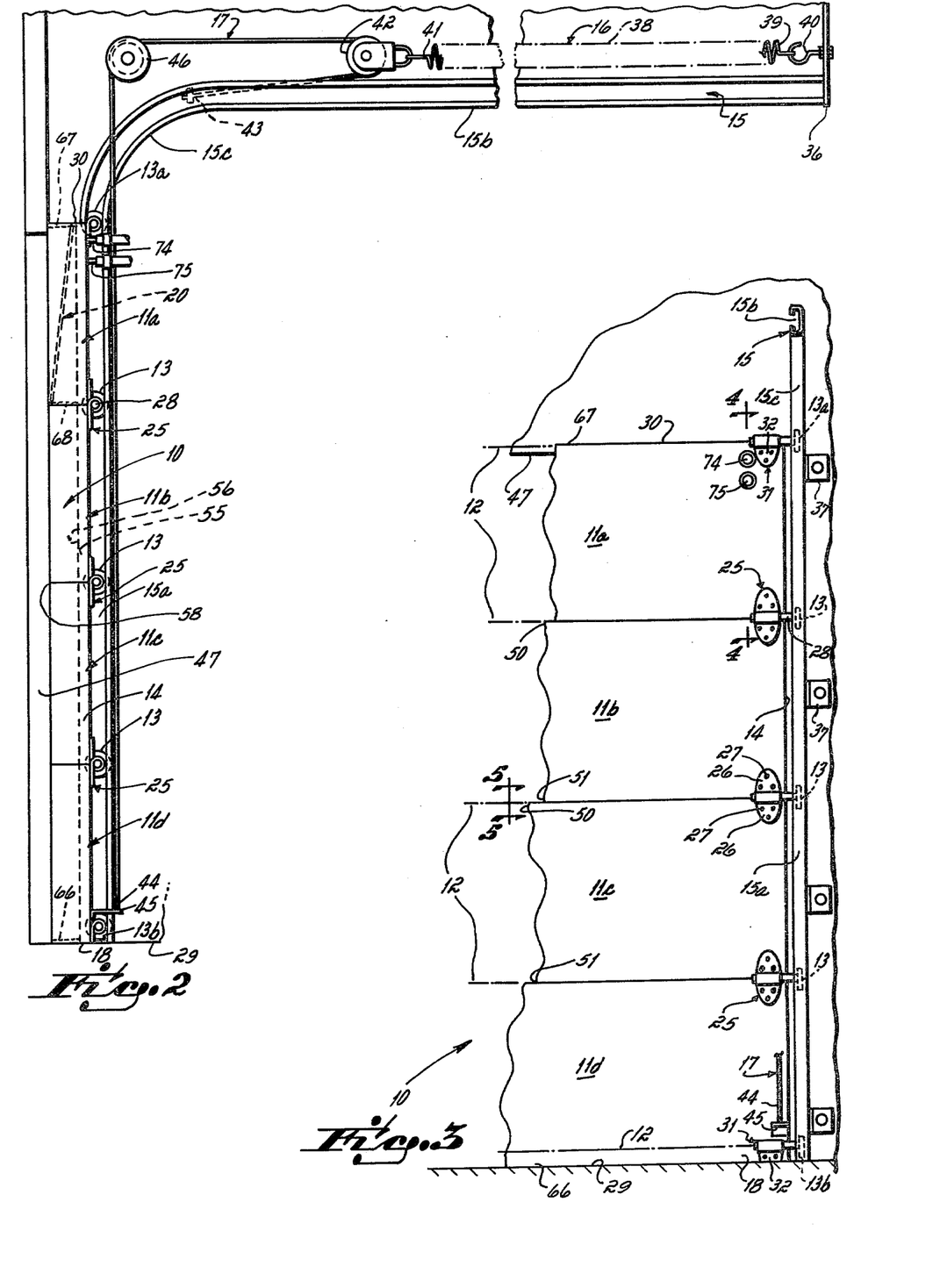
FIG. 2 is an end view of the solar collector illustrated in FIG. 1.
FIG. 3 is a partially broken away rear view of the solar collector illustrated in FIG. 1.

As shown more particularly in FIGS. 2 and 3, and on each side of the collector 10, each of the collector panels 11 are connected to an adjacent panel by a hinge plate 25 with opposing ears 26 and fasteners 27, the double eared hinge plate also serving as a bearing block for axle 28 of associated roller 13. The roller axles 28 define the hinge axes 12, thereby connecting the panels on hinge lines disposed horizontal relative to ground 29. Also, and on each side of the collector 10, the top edge 30 of the top panel 11a and the bottom edge 18 of the bottom panel 11d is provided with an axle plate 31 with a single ear 32, that axle plate serving as a bearing block for the axle 28 of roller 13a, 13b at the top 30 and bottom 18 edges of the collector 10. The collector's rollers 13 are adapted to cooperate with the track 15 adjacent each side 14 of the collector.

This track 15 is fixed to the building structure (not shown) adjacent the entryway as through use of brackets 36, 37 and is of a generally reverse C-shaped in cross section as shown in FIG. 3 so as to trap the collector's rollers 13 therein. Each track 15 includes a vertical section 15a adjacent entryway 47 of a building and a horizontal section 15b elevated above ground level, the horizontal section being connected to the vertical section through a curve section 15c so as to permit the multi-panel collector 10 to be translated between a vertical closed position shown in FIGS. 1–3 and a horizontal opened position, not shown, relative to the building's entryway 47. Each side 14 of the solar collector 10, and as previously mentioned, is also provided with a spring motor 16 for aid in raising the collector from the closed position to the opened position. In this regard, the spring motor 16 includes tension spring 38 fixed at one end 39 to the building structure through bracket 36 and hook 40, and fixed at the other end 41 to a movable pulley 42. The pulley 42 cooperates with a cable 17 fixed at one end 43 to the horizontal section 15b of the track, and fixed at the other end 44 adjacent the bottom edge 18 of the collector 10 to bracket 45 mounted on the lowest panel 11d. The cable 17 passes over idler pulley 46 immobily fixed to the building structure above the track's curved section 15c. In use, the spring motors 16 cooperates with the pulleys 42, 46 to aid in raising the multi-panel solar collector 10 from the first or solar collecting position shown in FIG. 2 to the overhead or storage position not shown.

The structure of the panels 11 of the multi-panel collector 10 is more particularly illustrated in FIGS. 1 and 4–6. The movable solar collector 10 is comprised of four panels 11a–11d of generally similar structure, however top panel 11a and bottom panel 11b are of a slightly different structure, as will be discussed below.

Figures 4, 5, 6:
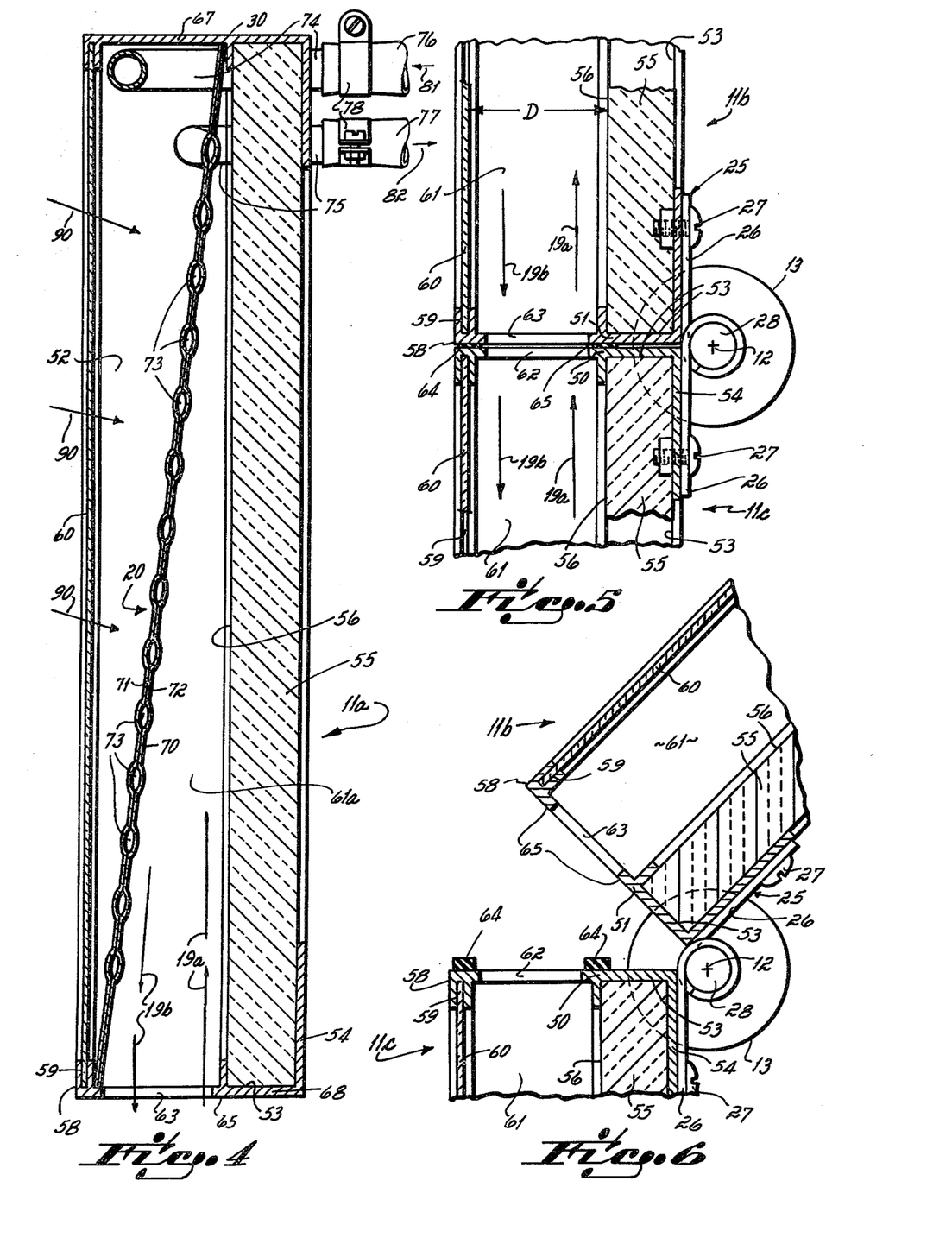
FIG. 4 is a cross-sectional view taken along line 4—4 of FIG. 3.
FIG. 5 is a cross-sectional view taken along line 5—5 of FIG. 3; showing the solar collector in its vertical position.
FIG. 6 is a cross-sectional view similar to FIG. 5, but illustrating the relationship of two adjacent collector panels as the solar collector moves between a vertical collecting position shown in FIG. 1 to a horizontal overhead storage position, not show.

Each of the two intermediate panels 11b, 11c is structured as illustrated in FIG. 5. As shown in that figure, each of the panels 11b, 11c includes a top wall 50 and a bottom wall 51 each of which extends along the top and bottom edges of the panel. The top 50 and bottom 51 walls are held in spaced relation by side walls 52, respectively, which cooperate to define each panel's frame 50–52. Each of the top 50 and bottom 51 walls is provided with an integrally formed U-shaped flange 53 along the back edge 54 thereof for receiving an insulator wall 55 between the top 50 and bottom 51 walls of that panel 11b or 11c. The insulator wall 55 forms the back wall of the collector panel and may be fabricated of, for example, wood. The insulating panel is preferably coated on its front face 56 with a heat absorbing substance, e.g., a black paint. The back walls 55 rigidifies the collector panel 11b, 11c, i.e., forms same into a structurally rigid panel. The front edge 58 of each top 50 and bottom 51 walls is also provided with a U-shaped flange 59 from one side wall 52 to the other, this flange 59 being of a width substantially less than the width of the rear edge bracket 53. The front flanges 59 are sized to receive a transparent panel 60, e.g., glazing in the form of shatter proof glass or the like, this front transparent panel 60 functioning as the front wall of the collector panel 11b, 11c respectively. The transparent front wall 60 extends from side wall 52 to side wall, and from top wall 50 to bottom wall 51 of the intermediate collector panels 11b, 11c, and the front wall 60 is spaced substantially forward of the rear wall 55 a distance D so that an interior space 61 is formed within the collector panels 11b, 11c. The interior space 61 is preferably of a width D greater than the combined thicknesses of the front 60 and rear 55 walls.

Figure 1:
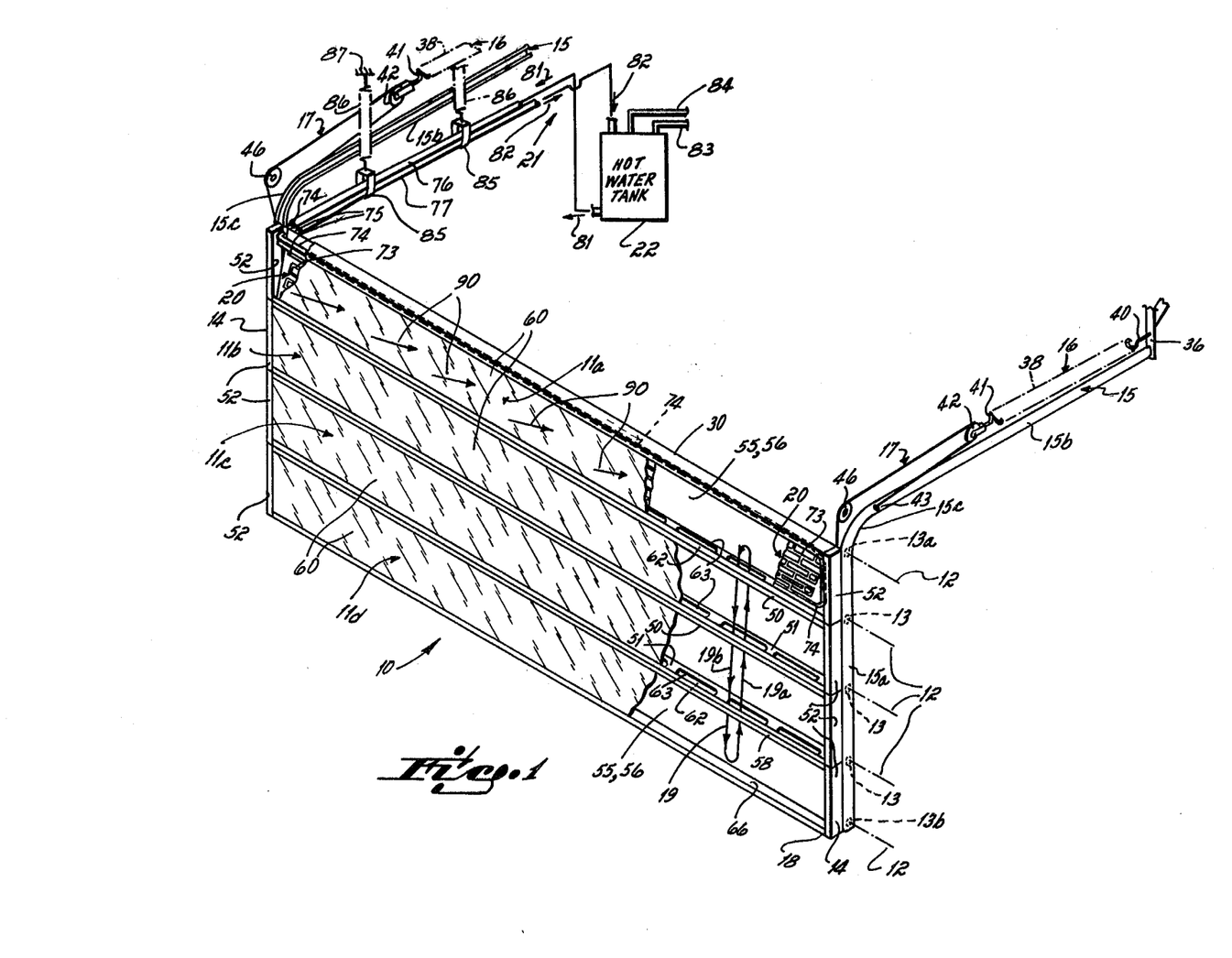
FIG. 1 is a partially broken away perspective view illustrating a first embodiment of a movable solar collector fabricated in accord with the principles of this invention.

The intermediate panels 11b, 11c, as shown particularly in FIGS. 1, 5 and 6, in the top 50 and bottom 51 walls each, are provided with ports 62, 63 spaced along these top and bottom walls, respectively, from one side 14 of the collector 10 to the other. These spaced ports 62, 63 are aligned one with another so that, when the panels 11b, 11c are in planar alignment as shown in FIG. 5, the adjacent ports cooperate one with another so as to interconnect the interior 61 of panel 11c with the interior 61 of panel 11b. This ported 62, 63 relationship between adjacent panels permits fluid flow 19 between the panels of, e.g., air. Further, the top wall 50 of the panel 11c is provided with sealer strips 64 extending from one side 14 to the other side 14 of the collector 10, the sealer strips being located on opposed sides of the ports 62. The sealer strips 64 on top wall 50 of lower intermediate panel 11c cooperate with the bottom face 65 of bottom wall 51 on upper intermediate panel 11b so as to create a reasonably air tight seal therebetween when the panels are in the use configuration shown in FIG. 5. However, and when the solar collector 10 is being translated from the vertical use position shown in FIG. 1 to the horizontal storage position, not shown, i.e., when an upper panel is pivoted on a hinge axis 12 relative to a lower panel as shown in FIG. 6, the seals 64 allow the panel 11b to readily separate from the panel 11c so as to allow the multi-panel collector 10 structure to make the bend defined by sections 15c of tracks 15.

The bottom collector panel 11d is identical in structure to the intermediate collector panels 11b, 11c except that the bottom wall 66 thereof has no ports. In other words, the bottom wall 66 of the bottom panel 11d is closed as shown in FIG. 1 so that the fluid within the collector panels 11a–11d, e.g., air, cannot pass out therefrom but is retained within the combined solar collector 10 structure along its bottom edge 18.

The upper collector panel 11a of the combined solar collector 10 is particularly illustrated in FIG. 4. As shown in that figure, the upper collector panel 11a is provided with a top wall 67 and a bottom wall 68. The bottom wall 68 is identical to the bottom wall 51 used in the intermediate panels 11b, 11c, and the top wall 67 is identical to the bottom wall 66 used in the lowest collector panel 11d. In other words, the upper panel's bottom wall 68 is provided with ports 63 along its length to cooperate with ports 62 along the length of the top wall 50 of the upper intermediate panel 11d. And the upper panel's top wall 67 is closed to atmosphere, i.e., is provided with no ports at all. The side walls 52 of the upper collector panel 11a are closed to atmosphere as with the side walls 52 of the intermediate 11b, 11c and lower 11d panels, the back wall 55 of the upper collector panel is fabricated of a rigid insulator, e.g., wood, and the front wall of the upper collector panel 11a is fabricated of a transparent sheet material 60, e.g., a glazing such as shatter proof glass.

The upper collector panel 11a also is provided with a fluid-to-fluid heat exchanger 20 angled between top 67 and bottom 68 walls within the interior 61 of that panel so as to define a circulation space 61a between the front face 56 of the rear wall 55 and the rear face 70 of the heat exchanger 20. This circulator space 61a is opened through ports 63 with the circulation spaces 61 in the intermediate 11b, 11c and lower 11d panels. In other words, the heat exchanger 20 is located in the interior space 61 between front 60 and rear 55 walls of the upper collector panel 11a, and between side walls 52 and top 67 and bottom 68 walls thereof, in such a manner that an air circulating space 61a is exposed to the air circulating in the spaces 61 of the intermediate 11b, 11c and lower 11d panels against the heat exchanger's back face 70 as discussed in greater detail below. The heat exchanger 20, being so positioned in the top panel 11a, is exposed directly to sunlight through the transparent front wall 60.

The heat exchanger 20 itself illustrated is fabricated of front face 71 and rear face 72 sheets deformed so as to provide a serpentine loop 73 between side walls 52 of the upper collector panel 11a, that loop including an inlet end 74 and an outlet end 75 thereof as shown in FIGS. 1 and 4. Both the inlet 74 and outlet 75 ends of the serpentine heat exchange loop 73 are connected with inlet 76 and outlet 77 piping or hosing by brackets 78. The hosing 76, 77 is connected at its other end with a use location, e.g., a hot water tank 22 as shown in FIG. 1. The water in the hot water tank 22 thus is permitted to circulate between the tank 22 and the heat exchanger 20 and the upper collector panel 11a in open loop fashion as shown by the infeed 81 and outfeed 82 directional arrows. The hot water tank 22 is also provided, of course, with a water supply line 83 and a use or tap line 84 by which hot water can be withdrawn from the tank for use. The hosing 76, 77 that connects the heat exchanger 20 to the tank 22 is restrained in an upper position relative to ground by collars 85 connected by tension springs 86 to an overhead support 87.

Use of the movable solar collector 10 illustrated in FIGS. 1–6, i.e., the first embodiment, is also shown in those figures. When the movable solar collector 10 is in the vertical use position as shown in FIGS. 1, 4 and 5, the four independent solar collector panels 11a–11d cooperate to form an integrated hollow interior space 61, 61a. The top 61a of the interior space is closed by the rear wall 55 of the top panel 11a and by the heat exchanger's rear face 70, see FIG. 4, and the bottom is closed by the bottom wall 66 of the lower panel 11d. The interior space 61, 61a is further defined by the front 60 and rear 55 walls of each panel 11b–11d, and the side walls 52 of each panel 11a–11d. Also when the collector 10 is in vertical use position, the top 11a, intermediate 11b, 11c and bottom 11d panels are in fluid, i.e., air, communication one with another through ports 62, 63 located in aligned relation one with another in the respective top and bottom edges of the related panels. Further, the interior spaces 61, 61a defined by adjacent panels 11a–11d being in sealed relation from the exterior environment or atmosphere due to seals 64 on the top wall 50 of a lower panel which cooperates with the bottom face 65 of the bottom wall 51 of an upper panel, see FIG. 5. In this vertical orientation, the movable solar collector 10 functions as a closure member, i.e., as a door, for the entryway 47 defined in a building structure. Further, and importantly, the solar collector 10 also functions as a solar collector in that solar energy passes through the transparent front wall 60 of the aligned collector panels onto the black faces 56 of the panel's rear walls 55. This sets up a convection current closed loop circulation path 19 through adjacent panels 11a–11d as shown in FIGS. 1, 4 and 5 in that heated air in the interior rises (see arrow 19a) and passes over the back face 70 of the heat exchanger 20 and, once the air has been cooled by the heat exchanger withdrawing the heat therefrom, the cooled air falls back (see arrow 19b) toward the bottom edge 18 of the combined collector panels. This hot air convection current 19 aids in heating the liquid, e.g., water, flowing through the serpentine conduit 73 defined in the heat exchanger 20. Further, and also importantly in this first embodiment, when the movable solar collector 10 is vertically oriented as shown in FIG. 1, direct sunlight (see arrow 90) impinges directly on the front face sheet 71 of the heat exchanger 20, thereby serving to heat the water by direct radiation. Thus, the heat exchanger 20 is heated on the front face by direct sunlight radiation, and is heated on the back face by hot air flow 19 thereover; this combines to effectively heat water that flows through the heat exchanger on a sunny day. Water from hot water tank 22 is circulated through the heat exchanger 20 through rubber hoses 76, 77. Suitable controls may be provided in the circulation line 21 so as to cause water circulation (by use of a pump, not shown) through the heat exchanger 20 when the temperature of the water in the tank falls below a desired temperature level.

The movable solar collector 10 is also movable from the vertical collector or use position into a horizontal storage position elevated above ground simply by raising the combined panels 11a–11d in overhead door fashion. Spring motors 16 and cables 17 cooperate to aid in raising the panel in overhead door fashion. When the collector 10 is disposed in horizontal track sections 15b of the guide tracks 15 for storage, the collector 10 will be inside the building so it cannot be exposed to sunlight at that time. However, moving of the solar collector 10 to the second or opened position permits ingress and egress through the entryway 47 for which the collector also functions as a closure member. When the collector 10 is moved between vertical and horizontal positions, the seals between adjacent panels 11a–11d break, as shown in FIG. 6, as the collector panels 11a–11d traverse the curved sections 15c of the tracks 15. But as soon as the collector panels 11a–11d are disposed in the planar attitude once again, the seals are again established through use of seal strips 64 so as to minimize loss of hot air therewithin. When in the overhead or storage position, the hosing 76, 77 that connects the heat exchanger 20 with the hot water tank 22 remains upraised above floor 29 level through use of springs 86. This first embodiment, therefore, illustrates a movable solar collector 10 having a first closed fluid circulation loop 19 wholly within the plural panels 11a–11d that transfers heat to a second fluid circulation loop 21 which includes a remote use location 22.

Figures 7, 8, 9:
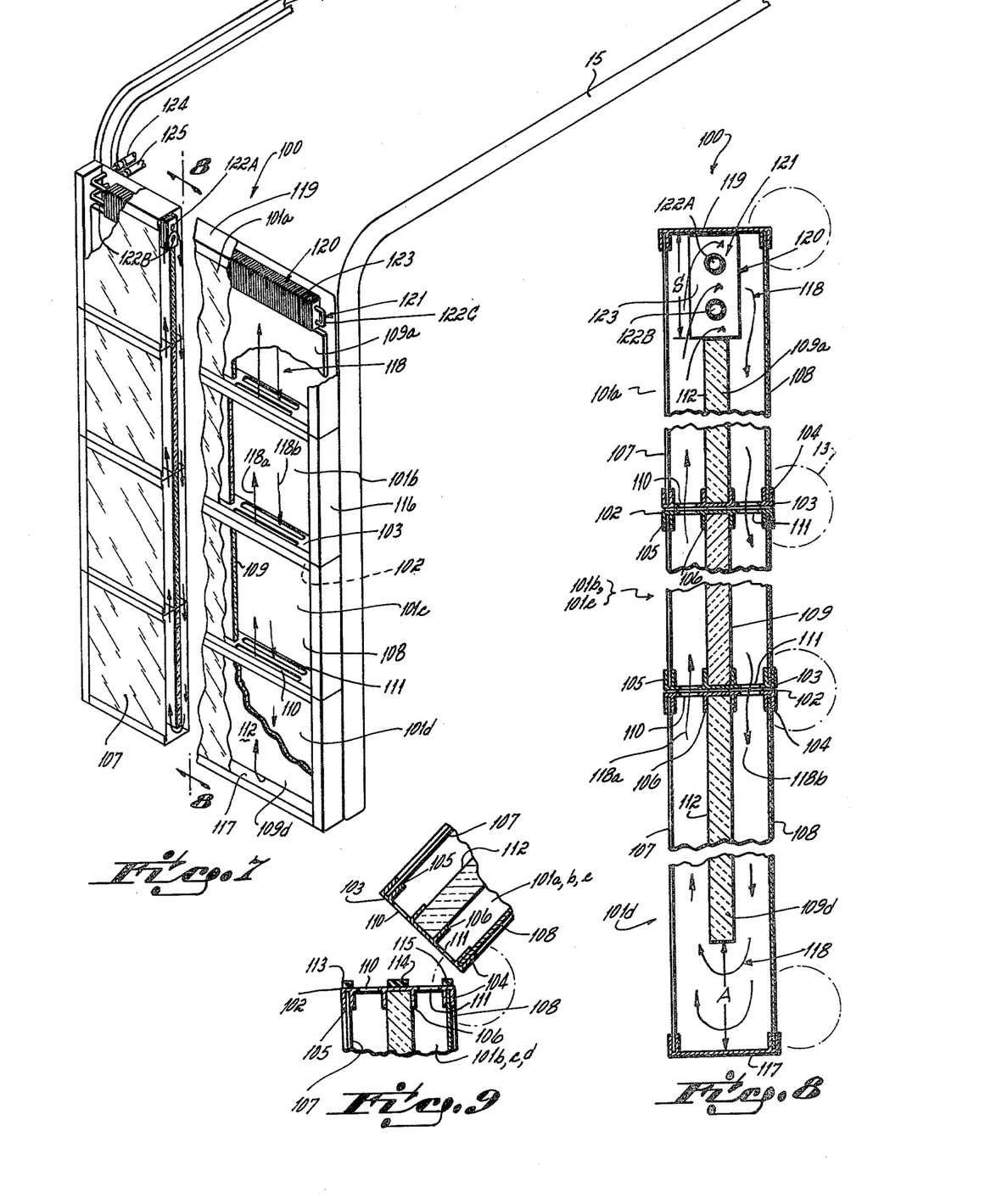
FIG. 7 is a partially broken away perspective view illustrating a second embodiment of a movable solar collector in accord with the principles of this invention.
FIG. 8 is a cross-sectional view taken along line 8—8 of FIG. 7.
FIG. 9 is a view similar to FIG. 6, but of the second embodiment of the solar collector.

A movable solar collector 100 of a second structural embodiment is illustrated in FIGS. 7–9. This collector embodiment is also in the nature of an overhead door of the type particularly useful as a garage door for residential buildings. The separate panels 101a–101d of this movable solar collector 100 embodiment are connected with tracks 15 by rollers 13 and hinge mechanism (not shown) in the same manner as is illustrated for the FIG. 1–6 embodiment. In this second embodiment 100, the intermediate panels 101b, 101c each comprise a top 102 and bottom 103 wall, a rear wall bracket 104 being disposed from end to end along each wall's rear edge, a front wall bracket 105 being disposed from end to end along each wall's front edge, and a middle wall bracket 106 being disposed from end to end intermediate the front and rear edges of each of the top and bottom walls. A transparent front wall 107, e.g., shatter proof glass, is carried between the front wall brackets 105, an opaque rear wall 108, e.g., wood, is carried between the rear wall brackets 104, and an intermediate insulator wall 109, e.g., of foamed polystyrene or the like, is carried in the middle wall brackets 106. The insulator walls 109 may be painted black or coated otherwise with a solar energy absorbing substance on the front face 112 thereof. Note each of the top 102 and bottom 103 walls defines two series of ports 110, 111 that extend longitudinally of those walls from one end to the other. The first is a series of upflow ports 110 positioned between the intermediate insulator wall 109 and the transparent front wall, and the second is a series of down flow ports 111 positioned between the intermediate wall 109 and the rear wall 108. The ports 110, 111 of each series are adapted to overlie one another in aligned fashion when the multiple collector panels 101a–101d are disposed in vertical or collecting attitude, see FIG. 8. Also, three sealing strips 113–115 are mounted on the top wall 102 of each of the lower three panels 101b–101d, those sealing strips being aligned parallel to the plane of the panel and positioned so as to provide a sealed relationship between a lower panel and an upper panel when same are aligned one with another, compare FIGS. 8 and 9. The upflow ports 110 are thus sealed from the downflow ports 111 to establish any up fluid (e.g., air) flow path 118a separate from a down fluid flow path 118b as described. Side walls 116 close the panels 101 on the side edges thereof.

The bottom panel 101d of this second collector embodiment is structured similar to the intermediate panels with the exception that the lower panel's bottom wall 117 is closed, i.e., has no ports. Further, the lower panel 101d includes an insulation wall 109d that extends from the top wall 102 of the lower panel toward but not into contact with the bottom wall 117, i.e., the insulation wall 109d terminates at a distance A above the lower panel's bottom wall. This structure, along with a similar structure for the top panel 101a described below, permits the air flow through the combined panel 101a–101d system to function in a closed loop path 118 as shown in FIG. 8.

The top panel 101a of this second collector embodiment includes a bottom wall 103, front wall 107, rear wall 108 and side walls 116 identical to those of the intermediate panels 101b, 101c, and a top wall 119 identical to the bottom wall 117 of the lower panel 101d. The intermediate wall 109a extends upwardly from the bottom wall 103 of the top panel toward, but stops short of, the top wall 119 of that panel, thereby leaving a space S between to define the other end of the closed fluid circulation loop 118. Within this space S, however, is provided a heat exchanger 120 comprised of a U-shaped pipe 121 and fins 123. The inflow leg 122A and the outflow leg 122B of the U-configuration being held in spaced relation one with another by the bight portion 122C and the spaced fins 123 of the heat exchanger.

This heat exchanger 120 is connected through piping or hosing 124, 125 to a remote use location, e.g., hot water tank, in the same manner as illustrated in connection with the first embodiment shown in FIG. 1.

In use of the second embodiment, the solar collector panels 101a–101d are movable between the vertical use and horizontal storage position in the same manner and by use of the same structure as the first embodiment illustrated in FIGS. 1–6. However, and when in the use position, solar energy impinging on the front faces 112 of the intermediate walls 109 through the transparent front walls 107 of the collector panels 101a–101d induces hot air convection in closed loop 118 fashion through ports 110, 111 within the combined panel system as shown in FIG. 8. This hot air convection induced closed loop path 118 passes over the heat exchanger 120 at the top of the loop so as to heat, e.g., water, circulating from, e.g., a hot water tank, through use of the infeed 124 and outfeed 125 piping. Note particularly in this second embodiment that the downflow portion 118b of the primary fluid's closed loop path 118 is separate from the upflow portion 118a thereof as defined by the intermediate walls 109. As with the first embodiment, suitable controls (not shown) may be provided, when the infeed and the outfeed piping is connected with a hot water tank, so as to cause that circulation flow through the piping 124, 125 to occur when the temperature of the hot water in the tank passes below a minimum desired value.

Figures 10, 11:
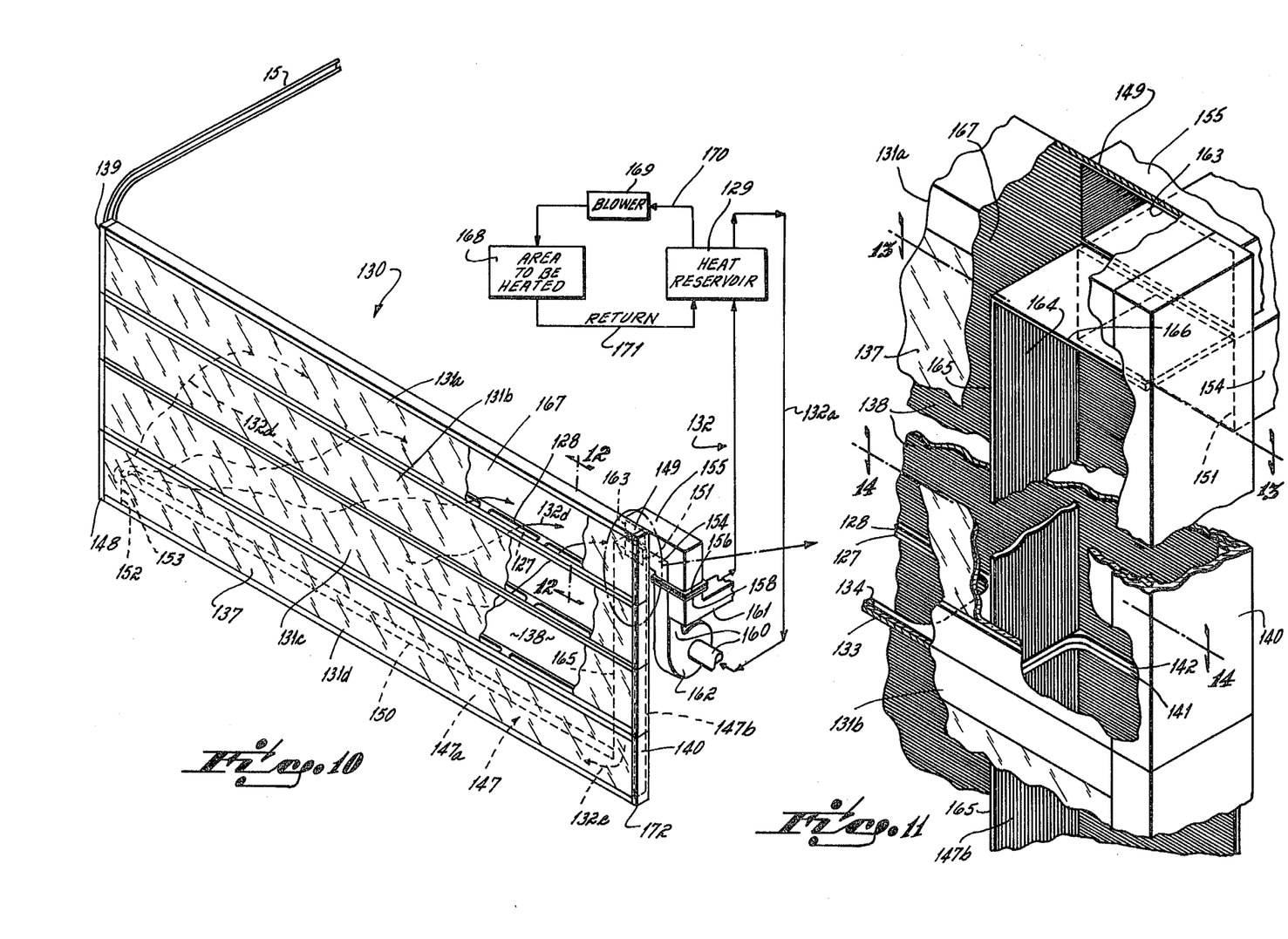
FIG. 10 is a partially broken away perspective view illustrating a third embodiment of a movable solar collector in accord with the principles of this invention.
FIG. 11 is a blown-up perspective view of the encircled portion of FIG. 10.
Figure 12:
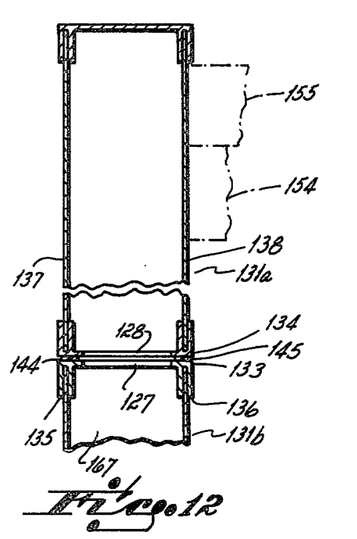
FIG. 12 is a cross-sectional view taken along line 12—12 of FIG. 10.

A third embodiment of the movable solar collector 130 in an overhead door environment is illustrated in FIGS. 10–14. In this particular collector 130 structure there is no fluid-to-fluid heat interchange within the plural collector panels 131a–131d. There is only one circulatory loop 132 used between the collector 130 and the remote use location 129, i.e., that fluid loop includes the collector 130 as well as the remote use location 129, e.g., a heat reservoir. In this particular structure, the two intermediate panels 131b, 131c are provided with tops 133 and bottom 134 walls each having front 135 and rear 136 edge brackets for front 137 and rear 138 walls as shown in FIG. 12. The rear wall 138 of each panel 131b, 131c is of a rigid heat insulating material, e.g., wood, and the front wall 137 of each panel is transparent, e.g., shatter proof glass. The top 133 and bottom 134 walls are provided with a series of upflow ports 127, 128 adapted to align one with another when the collector panels 131b, 131c are in the coplanar or vertical use position shown in FIG. 10. These upflow ports 127, 128 extend from the left side walls 139 (as shown in FIG. 10) to adjacent the right side walls 140 but stop short thereof. A series of vertically aligned downflow ports 141, 142 is established also in the top 133 and bottom 134 walls, these downflow ports being aligned one with another when the panels 131b, 131c are coplanar. The upflow ports 127, 128 are separated from the downflow ports 141, 142 in each panel 131b, 131c by a separate wall 143. Sealing strips 144, 145 are provided along the front and rear edges of the top walls 133 of the lower three panels 131b–131d from one end wall 139 to the other end wall 140, those strips being analogous to those strips 64 illustrated in FIG. 6 for the first embodiment.

The bottom panel 131d in this third embodiment is identical in structure of the two intermediate panels 131b, 131c with certain exceptions. First, the bottom panel's bottom wall 134 has no ports therein. And second, a horizontal leg 147a and the lower portion of a vertical leg 147b of a distributor duct 147 is provided interiorly of that bottom panel 131d to distribute return flow fluid from return leg 132a of the fluid loop 132 into corner 148 of the collector 130 which is opposite to corner 149 of the collector 130 where that return air flow is re-admitted into the collector. The distributor duct segments 147a, 147b are defined by bottom wall 134 and side wall 140 of the bottom panel 131d, and is also defined by separator wall 143 (which separates the bottom panel's upflow ports 127 from its downflow port 14) and by duct wall 150 that extends parallel to the panel's bottom wall 134 and between the bottom panel's front 137 and rear 138 walls. Thus, the bottom panel's separator wall 143, duct wall 150, bottom wall 134, front wall 137 and rear wall 138 cooperate to direct recirculated air flow 132c through the collector's panel 131a–131d from the collector's input port 151 to the interior discharge port 152 at the end 153 of the distributor duct 147.

The upper panel 131a of this third embodiment is identical with the intermediate panels 131b, 131c throughout the major part of its length except for the top wall 133 which is closed, i.e., has no ports therein. The right end of the top panel 131a, as shown in FIG. 10, 11, 13 and 14, includes a fluid inlet duct section 154 fixed to the panel's rear wall 138, and a fluid outlet duct section 155 also fixed to the panel's rear wall. The fluid inlet 154 and outlet 155 duct sections are provided with a flange 156 adapted to sealingly engage in mating fashion with a flange 158 carried by loop return duct 160 and loop discharge duct 161. These return 160 and discharge 161 ducts are immobile or fixedly mounted relative to the movable collector 130. Fan 162 is incorporated in the return duct 160 so as to induce fluid flow within that closed loop circuit 132 that includes the movable solar collector 130 and the remote use location 129, e.g., a heat reservoir.

Figure 13:
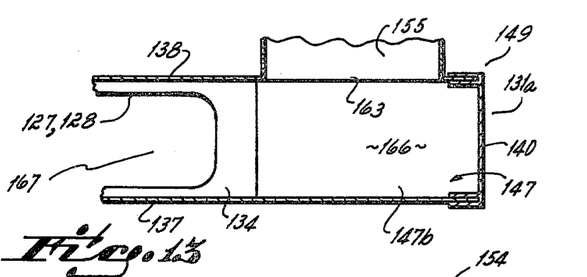
FIG. 13 is a cross-sectional view taken along line 13—13 of FIG. 11.
Figure 14:
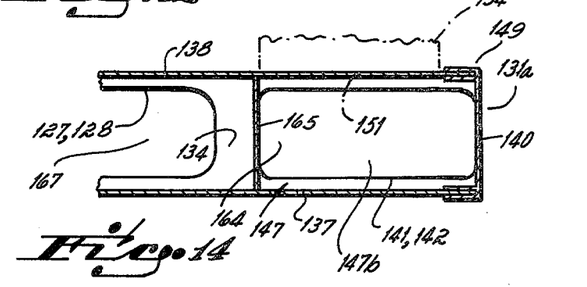
FIG. 14 is a cross-sectional view taken along line 14—14 of FIG. 11.

The top panel's outlet duct 155, as illustrated in FIGS. 11 and 13, cooperates with outlet port 163 in the rear wall 138 of that panel through which fluid, e.g., air, heated in the interior of the multiple collector panels 131 can pass. The top panel's inlet duct 154 connects with that panel through an inlet port 151 in the panel's rear wall 138. The inlet port 151 opens into a sub-chamber 164 within the top panel 131a defined by vertical 165 and horizontal 166 separator walls. The separator walls 165, 166 extend between front 137 and rear 138 walls. Note all panels' vertical separator walls 143, 165 are in planar alignment when the collector 130 is in collecting position shown in FIG. 10. This structure, along with downflow ports 141, 142, establishes the vertical leg 147b which cooperates with a horizontal leg 147a to define distributor duct 147 located interiorly of the collector. This distributor duct 147 structure, of course, prevents interference of using solar heated air flow 132d through the collector's panels 131a–131d with return air flow 132c as that return air flow is distributed from inlet port 151 at one corner 149 of the collector 130 to discharge port 152 at diagonally opposite corner 148 of the collector 130. After the return air flow 132c is discharged from port 152 into the hollow interior space 167 of the bottom panel 131d, it is exposed to solar energy through transparent front walls 137. As the interior air is heated, it flows upwardly from the collector corner 148 where it is discharged through the upper solar collector panels 131d, 131c, 131b, 131a (in that sequence) in a generally diagonal flow path 132c fashion through upflow ports 127, 128 until same is discharged to the outlet duct 155 in the upper panel 131a. Therefore, this third embodiment does not have a primary closed fluid flow loop interiorly of the multiple collector panels 131a–131d that cooperates with a secondary fluid flow loop which includes a heat exchanger interiorly of the collector 130 (as is the case in the first and second embodiment), but the fluid flow through the panels 131a–131d also flows between the collector 130 and the heat reservoir 129. In other words, and in this third embodiment, there is no heat exchange between first and second fluids within the movable collector panel 130 itself.

As shown in FIG. 10, the heat reservoir 129 with which the collector panel 130 is used may be in the nature of a large volume of rock adapted to collect and maintain heat which it extracts from the air flow through the fluid loop 132 system that includes the movable solar collector 130. This heat may be extracted when desired to aid in heating an interior environment 168 of, e.g., a residential building, through use of a blower 169 and feed 170 and return 171 air ducts as known to the art.

In use, this third solar collector 130 embodiment also functions as an overhead door, and is shown in the closure position in FIG. 10. The overhead track 15 and spring motor with cable (not shown) is the same as for that first embodiment shown in FIGS. 1 and 6. When the collector 130 is upraised, i.e., when the door is opened in overhead door fashion, the upper panel's inlet 154 and outlet 155 duct sections separate at sealing joints 156, 158 from the fixed ductwork 160, 161 as the panel is moved to the horizontal overhead storage position. The seal at joint 156, 158 is re-established therebetween when the bottom edge 172 of the collector 130 bottoms out against the floor (not shown) as the collector is moved back to the vertical or closure position shown in FIG. 10. This sealing relation may be established through use of sealing strips, not shown, attached to the mating flanges 156, 158 of the ductwork 154, 160 and 155, 161.

Figures 15, 16:
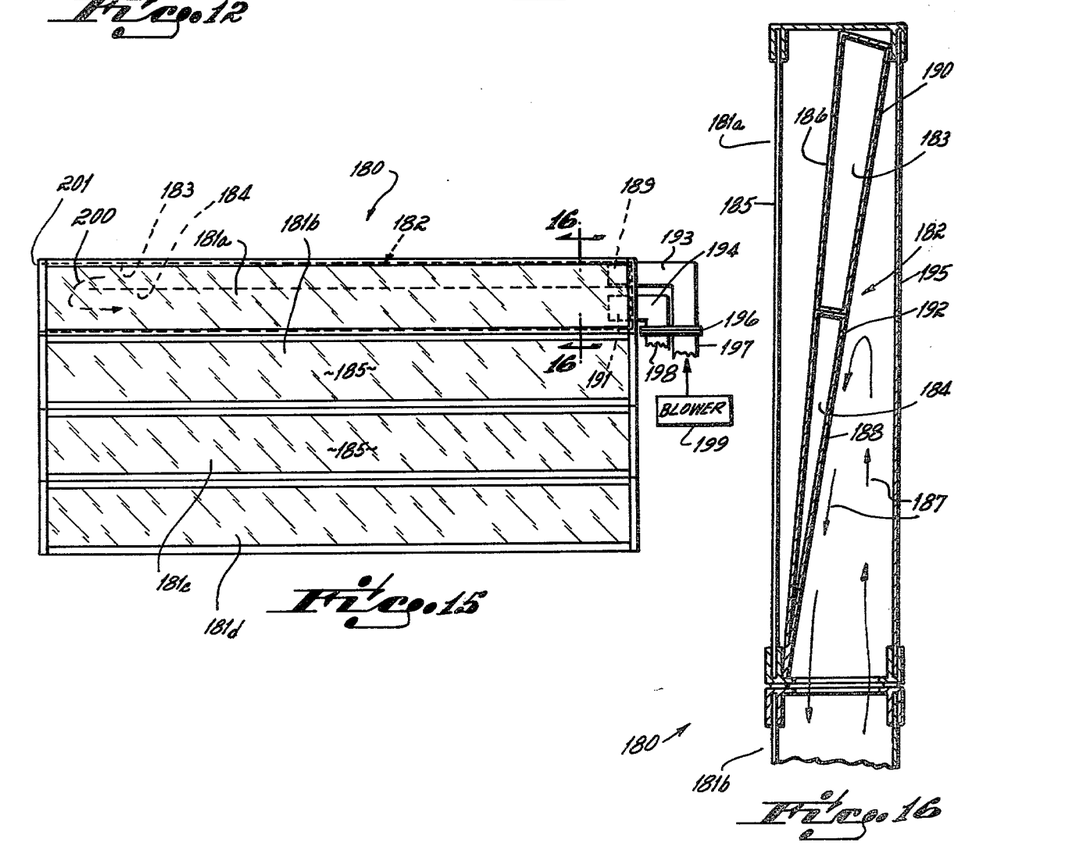
FIG. 15 is a front view of a fourth embodiment of a solar collector in accord with the principles of this invention.
FIG. 16 is a cross-sectional view taken along line 16—16 of FIG. 15.

In the fourth solar collector 180 embodiment illustrated in FIGS. 15 and 16, the intermediate 181b, 181c and lower 181d panels of the movable solar collector are identically structured to those of the first embodiment shown in FIGS. 1–6. The upper panel 181a, however, is provided with a heat exchanger 182 that includes an infeed duct 182 and an outfeed duct 184 which extend across the width of the upper panel, and which are exposed directly to solar energy through the transparent front wall 185 of that upper panel 181a on the front face 186 while being simultaneously exposed to hot air convection current loop 187 on the rear face 188 which is established between all of the panels 181a–181d as shown in FIG. 16, and analogous to that hot air convection induced flow loop 19 for the first collector 10 embodiment. The infeed 183 and outfeed 184 ducts extend from one side wall 201 of upper panel 181a to the other, and communicate at one end only to provide a U-shaped fluid, e.g., air, flow path 200 therethrough. Input port 189 is defined in rear wall 190 of the infeed duct 183 at the other end thereof and outlet port 191 is defined in rear wall 192 of the outfeed duct 184 at that same other end thereof as shown in FIG. 15. The input port 189 and outlet port 191 are respectively connected with fluid inlet 193 and fluid outlet 194 duct sections mounted on the rear wall 195 of the upper panel 181a. The inlet 193 and outlet 194 duct sections are also seated in sealing flange 196 relation with return 197 and discharge 198 ducts as shown in the third embodiment illustrated in FIG. 10, the return 197 and discharge 198 ducts being permanently fixed to the building structure. A blower 199 is used to insure circulation through ducts 197, 198 between a heat reservoir (not shown) in that type system shown in FIG. 10, and this fourth embodiment of the movable solar collector 180. This fourth solar collector 180 has its panels 181 hingedly connected together, and is mounted on guide tracks by rollers, in the same fashion as the first embodiment shown in FIGS. 1–6 so that this fourth embodiment can function as an overhead door, too. This fourth embodiment, therefore, illustrates a first interior closed loop fluid system 187 is the movable solar collector 180 in which air is the fluid. And this structure also makes use of a second closed loop fluid system 200 on path that includes the heat exchanger 182 in collector 180 and a remote use location, the second loop 200 also using air as the fluid as opposed to liquid, e.g., water, illustrated in the FIG. 1–6 embodiment.

Having described in detail the preferred embodiment of my invention, what I desire to claim and protect by Letters Patent is:

1. A movable solar collector comprising
   a plurality of panels structurally separate one from the other, each of said panels having a solar energy transmitting front face wall, each of said panels being structurally inflexible, and each of said panels defining a hollow space interiorly thereof,
   hinge structure connecting adjacent plural panels one with another, said hinge structure permitting movement of all said inflexible panels together between first and second positions as desired by the user, and all said inflexible panels being exposable to solar energy in one of said first and second positions,
   port structure established in adjacent flexible panels, said port structure being aligned when said collector is positioned for exposure to solar energy to permit fluid flow between adjacent panels, without loss thereof to atmosphere, and said port structure being temporarily out of alignment as said inflexible panels move between said first and second positions,
   seal structure connected with said port structure, said seal structure being seal tight to substantially eliminate fluid flow from between said panels into atmosphere as fluid flow occurs between adjacent panels, and said seal structure being temporarily broken as said inflexible panels move between said first and second positions, and
   conduit means connected with said hollow panel structure at one end and connectable with a use location at the other end, said conduit means permitting the heat of said fluid, as generated by exposure of all said panels to solar energy, to be transferred from said collector to said use location.

2. A movable solar collector as set forth in claim 1, said seal structure comprising
   at least one seal strip fixed to one of the top and bottom walls of an adjacent pair of panels, said seal strip cooperating with the other of the top and bottom walls of said adjacent panels to establish said seal when said plural panels are in that position where said collector is exposable to solar energy, and said seal being breakable as said collector is moved between said first and second positions.

3. A movable solar collector as set forth in claim 1, said hinge structure that connects adjacent panels establishing hinge lines generally horizontal relative to ground, said hinge lines cooperating to permit said solar collector to move between a first position generally vertical relative to ground and a second position generally horizontal relative to ground.

4. A movable solar collector as set forth in claim 1, said collector further comprising
roller and track means connected with said plural panels, said roller and track means guiding movement of said movable solar collector between said first and second positions.

5. A movable solar collector as set forth in claim 1, said conduit means being directly connected with said hollow panel structure, the flow of that fluid through said hollow panels also being the same fluid that flows through said conduit means to a use location so that the fluid heated by exposure to solar energy is the same fluid from which heat is extracted at said use location, thereby establishing a single loop path of fluid flow which includes said collector and said use location.

6. A movable solar collector as set forth in claim 5, said conduit means comprising
return air flow and hot air flow ducts extending between said use location and said plural panels, said return and hot air ducts being immobile relative to said plural panels, and
connector means structured to connect said plural panels with said ducts when said collector is positioned for exposure to solar energy.

7. A movable solar collector as set forth in claim 1, said collector further comprising
a heat exchanger connected to at least one of said plural panels, said plural panels defining an interior first fluid flow loop adapted to pass over at least one face of said heat exchanger interiorly of said collector, and said heat exchanger defining a second fluid flow loop that connects said collector and said use location.

8. A movable solar collector as set forth in claim 7, said heat exchanger being connected to the top hollow panel of said collector when said panels are inclined relative to the horizontal in the solar energy exposure position, said heat exchanger also being directly exposed to solar energy when said collector is in the solar energy position, and said first fluid being air and said air defining a closed hot air convection loop which passes over said heat exchanger.

9. A door for a doorway, said door comprising
hollow panel structure that is structurally inflexible, said hollow panel structure being sized to function at least partially as a closure for said doorway when said hollow panel structure is in a first position, said hollow panel structure being movable to a second position to permit ingress and egress through said doorway, and said hollow panel structure having a front wall adapted to be exposed to solar energy when said door is in one of said first and second positions to allow the solar energy to warm a fluid interiorly of said hollow panel structure,
a hinge structure connected to said inflexible hollow panel structure, said hinge structure permitting movement of said inflexible hollow panel structure to that one of said first and second positions at which said structure is exposed to solar energy, said hinge structure also permitting movement of said hollow panel structure between open and closed positions, and
conduit means connectable with said door and with a use location when said door is positioned for exposure to solar energy, said conduit means allowing heat received by said fluid interiorly of said hollow panel structure to be transferred from said door to said use location.

10. A door as set forth in claim 9, said hollow panel structure comprising
a plurality of panels separate one from the other, each of said panels having a solar energy transmitting front face wall, each of said panels being structurally inflexible, and each of said panels defining a hollow space interiorly thereof, and
fluid transfer structure connecting adjacent hollow panels one with another, said fluid transfer structure allowing fluid flow between adjacent panels during exposure of said plural panels, and said fluid within said plural panels, to solar energy.

11. A door as set forth in claim 10, said fluid transfer structure comprising
port structure established in the adjacent top and bottom walls in adjacent panels, said port structure being aligned when said door is positioned for exposure to solar energy, thereby permitting fluid flow between adjacent panels.

12. A door as set forth in claim 11, said fluid transfer structure further comprising
seal structure connected with said port structure, said seal structure substantially eliminating fluid flow from between said panels into atmosphere as fluid flow occurs between adjacent panels.

13. A door as set forth in claim 12, said seal structure comprising
at least one seal fixed to at least one of each adjacent pair of panels, said seal cooperating with the other of said adjacent panels to establish said seal when said plural panels are in that position where said door is exposable to solar energy, and said seal being breakable as said door is moved between said first and second positions.

14. A door as set forth in claim 11, said hinge structure connecting adjacent panels in a manner that establishes hinge lines generally horizontal relative to ground, said hinge lines cooperating to permit said hollow panel structure to move between a first position generally vertical relative to ground and a second position generally horizontal relative to ground.

15. A door as set forth in claim 14, said door further comprising
roller and track means connected with said plural panels, said roller and track means guiding movement of said door between said first and second positions.

16. A door as set forth in claim 9, said conduit means being directly connected with said hollow panel structure, the flow of that fluid through said hollow panels also being the same fluid that flows through said conduit means to a use location so that the fluid heated by exposure to solar energy is the same fluid from which heat is extracted at said use location thereby establishing a single loop path of fluid flow which includes said door and said use location.

17. A door as set forth in claim 16, said conduit means comprising
return air flow and hot air flow ducts extending between said use location and said plural panels, said return and hot air ducts being immobile relative to said plural panels, and connector means structured to connect said plural panels with said ducts when said door is positioned for exposure to solar energy.

18. A door as set forth in claim 9, said door further comprising a heat exchanger connected to said hollow panel structure, said hollow panel structure defining an interior first fluid flow loop adapted to pass over at least one face of said heat exchanger interiorly of said hollow panel structure, and said heat exchanger defining a second fluid flow loop that connects said hollow panel structure and said use location.

19. A door as set forth in claim 18, said heat exchanger being positioned adjacent the top of said collector hollow panel structure when said hollow panel structure is in the solar energy exposure position, said heat exchanger also being directly exposed to solar energy when said collector is in the solar energy position, and said first fluid being air which moves in a closed hot air convection loop which passes over said heat exchanger.

20. An overhead door for a doorway, said door comprising a plurality of panels structurally independent one from another, each of said panels defining a hollow space internally thereof, each of said panels being structurally inflexible, and said panels collectively being sized to function as a closure for said doorway, hinge structure interconnecting said inflexible plural panels one with another along hinge lines generally horizontal relative to ground, said hinge structure permitting movement of said inflexible hollow panels between an open position generally horizontal relative to ground and a close position generally vertical relative to ground, as desired by the user, said inflexible plural panels being adapted for exposure to solar energy in at least one of said open and closed positions, fluid transfer structure connecting adjacent inflexible hollow panels one with another, said fluid transfer structure allowing fluid flow between inflexible adjacent panels, said fluid flow occurring in response to warming of said fluid by solar energy upon exposure of said inflexible hollow plural panels to solar energy, and conduit means connected with said door when said inflexible hollow panels are in at least one of the open and closed positions, said conduit means being adapted to cooperate with at least one of said plural hollow panels for transferring solar energy in said fluid to a use location removed from said door.

21. An overhead door as set forth in claim 20, said fluid transfer structure comprising port structure established in the adjacent walls in adjacent panels, said port structure being aligned when said door is positioned for exposure to solar energy, thereby permitting fluid flow between adjacent panels.

22. An overhead door as set forth in claim 21, said fluid transfer structure further comprising seal structure connected with said port structure, said seal structure substantially eliminating fluid flow from between said panels into atmosphere as fluid flow occurs between adjacent panels.

23. An overhead door as set forth in claim 22, said seal structure comprising at least one seal fixed to at least one of each adjacent pair of panels, said seal cooperating with the other of said adjacent panels to establish said seal when said plural panels are in that position where said collector is exposable to solar energy, and said seal being breakable as said door is moved between said first and second positions.

24. An overhead door as set forth in claim 21, said door further comprising roller and track means connected with said plural panels, said roller and track means guiding movement of said door between said opened and closed positions.

25. An overhead door as set forth in claim 20, said conduit means being directly connected with said hollow panels, the flow of that fluid through said hollow panels also being the same fluid that flows through said conduit means to a use location so that the fluid heated by exposure to solar energy is the same fluid from which heat is extracted at said use location, thereby establishing a single loop path of fluid flow which includes said door and said use location.

26. An overhead door as set forth in claim 25, said conduit means comprising return air flow and hot air flow ducts extending between said use location and said plural panels, said return and hot air ducts being immobile relative to said plural panels, and connector means structured to connect said plural panels with said ducts when said door is positioned for exposure to solar energy.

27. An overhead door as set forth in claim 20, said door further comprising a heat exchanger connected to at least one of said plural panels, said plural panels defining an interior first fluid flow loop adapted to pass over at least one face of said heat exchanger interiorly of said door, and said heat exchanger defining a second fluid flow loop that connects said door and said use location.

28. An overhead door as set forth in claim 27, said heat exchanger being connected to the top hollow panel of said door when said panels are inclined relative to the horizontal in the solar energy exposure position, said heat exchanger also being directly exposed to solar energy when said panels are in the solar energy position, and said first fluid being air that moves in a closed hot air convection loop over said heat exchanger.

29. A movable solar collector comprising a plurality of panels separate one from the other, each of said panels having a solar energy transmitting front face wall, and each of said panels defining a hollow space interiorly thereof, hinge structure connecting adjacent plural panels one with another, said hinge structure permitting movement of said movable solar collector between first and second positions as desired by the user, and said collector being exposable to solar energy in one of said first and second positions, port structure established in the adjacent top and bottom walls in adjacent panels, said port structure being aligned when said collector is positioned for exposure to solar energy to permit fluid flow between adjacent panels, seal structure connected with said port structure, said seal structure substantially eliminating fluid flow from between said panels into atmosphere as solar energy induced fluid flow occurs between adjacent panels, said seal comprising at least one seal strip fixed to one of the top and bottom walls of an adjacent pair of panels, said seal strip cooperating with the other of the top and bottom walls of said adjacent panels to establish said seal when said plural panels are in that position where said collector is exposable to solar energy, and said seal being breakable as said collector is moved between said first and second positions, and conduit means connected with said hollow panel structure at one end and connectable with a use location at the other end, said conduit means permitting the heat of said fluid, as generated by exposure of said panels to solar energy, to be transferred from said collector to said use location.

30. A movable solar collector as set forth in claim 29, said hinge structure that connects adjacent panels establishing hinge lines generally horizontal relative to ground, said hinge lines cooperating to permit said solar collector to move between a first position generally vertical relative to ground and a second position generally horizontal relative to ground.

31. A movable solar collector as set forth in claim 30, said collector further comprising
roller and track means connected with said plural panels, said roller and track means guiding movement of said movable solar collector between said first and second positions.

32. A movable solar collector as set forth in claim 29, said conduit means being directly connected with said hollow panel structure, the flow of that fluid through said hollow panels also being the same fluid that flows through said conduit means to a use location so that the fluid heated by exposure to solar energy is the same fluid from which heat is extracted at said use location, thereby establishing a single loop path of fluid flow which includes said collector and said use location.

33. A movable solar collector as set forth in claim 29, said collector further comprising
a heat exchanger connected to at least one of said plural panels, said plural panels defining an interior first fluid flow loop adapted to pass over at least one face of said heat exchanger interiorly of said collector, and said heat exchanger defining a second fluid flow loop that connects said collector and said use location.

* * * * *